(12) United States Patent
Hsu et al.

(10) Patent No.: US 7,819,529 B2
(45) Date of Patent: Oct. 26, 2010

(54) PROJECTING SYSTEM WITH COLOR TEMPERATURE ADJUSTING FUNCTION

(75) Inventors: Chien-Wen Hsu, Taipei Hsien (TW); Chia-Hung Kao, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 449 days.

(21) Appl. No.: 11/953,687

(22) Filed: Dec. 10, 2007

(65) Prior Publication Data

US 2009/0021701 A1  Jan. 22, 2009

(30) Foreign Application Priority Data

Jul. 20, 2007  (CN) .......................... 2007 1 0201144

(51) Int. Cl.
  *G03B 21/00* (2006.01)
(52) U.S. Cl. .............................. 353/31; 353/52; 353/82; 353/85
(58) Field of Classification Search .................... 353/20, 353/31, 81, 85, 82, 52; 348/750, 751, 744, 348/757, 743; 359/443; 349/7, 106
  See application file for complete search history.

(56) References Cited

U.S. PATENT DOCUMENTS 7,070,284 B2 * 7/2006 Tanaka et al. .................. 353/84
7,284,867 B2 * 10/2007 Hamaya ....................... 353/69
2004/0130555 A1   7/2004 Ko et al.
2005/0185144 A1 * 8/2005 Imahase et al. ............... 353/31
2006/0008141 A1 * 1/2006 Lin et al. ..................... 382/167

FOREIGN PATENT DOCUMENTS

JP       2005-10472       1/2005

* cited by examiner

*Primary Examiner*—Georgia Y Epps
*Assistant Examiner*—Francis M Legasse, Jr.
(74) *Attorney, Agent, or Firm*—Jeffrey T. Knapp

(57) ABSTRACT

A projecting system includes a light source for emitting light, a color temperature detecting device for detecting a color temperature value of the light emitted from the light source, a control device for storing a plurality of selectable pre-determined color temperature values therein for a user to select a pre-determined color temperature value, an adjusting device, and a light-modulating device. The adjusting device is disposed in a light path associated with the light source. The control device is configured for controlling the adjusting device to adjust transmittance of the light transmitted therethrough so as to adjust the color temperature value of the light to the selected pre-determined color temperature value. The light-modulating device modulates the light to create an image.

18 Claims, 2 Drawing Sheets

PROJECTING SYSTEM WITH COLOR TEMPERATURE ADJUSTING FUNCTION

BACKGROUND

1. Field of the Invention

The present invention relates to projecting technology, and particularly, to a projecting system for adjusting a color temperature value thereof.

2. Description of Related Art

In a projecting system, light emitted from a light source is modulated by a light-modulating device (e.g., a liquid crystal panel or a digital micromirror device) and then is projected via a projecting lens to form an image. Hue of the image is related to a color temperature value of the light, that is, proportions of red, green, and blue in the light.

Generally, a plurality of profiles with different pre-determined color temperature values are pre-built in the projecting system. User may select one profile with a pre-determined color temperature value of an image to satisfy his need. However, heat generated by the light source may influence real color temperature value of the light emitted from the light source. Therefore, the real color temperature value of the light doesn't fit the pre-determined color temperature value of the profile selected.

What is needed, therefore, is to provided a projecting system, in which the above problems are eliminated or at least alleviated.

SUMMARY

The present invention relates to a projecting system. The projecting system includes a light source for emitting light, a color temperature detecting device for detecting a color temperature value of the light emitted from the light source, a control device for storing a plurality of selectable pre-determined color temperature values therein for a user to select a pre-determined color temperature value, an adjusting device, and a light-modulating device. The adjusting device is disposed in a light path associated with the light source. The control device is configured for controlling the adjusting device to adjust transmittance of the light transmitted therethrough so as to adjust the color temperature value of the light to the selected pre-determined color temperature value. The light-modulating device modulates the light to create an image.

Other advantages and novel features of the present invention will become more apparent from the following detailed description of present embodiments when taken in conjunction with the accompanying drawings, in which:

DETAILED DESCRIPTION OF THE INVENTION

Reference will now be made to the figures to describe the present embodiments in detail.

Figure 1:
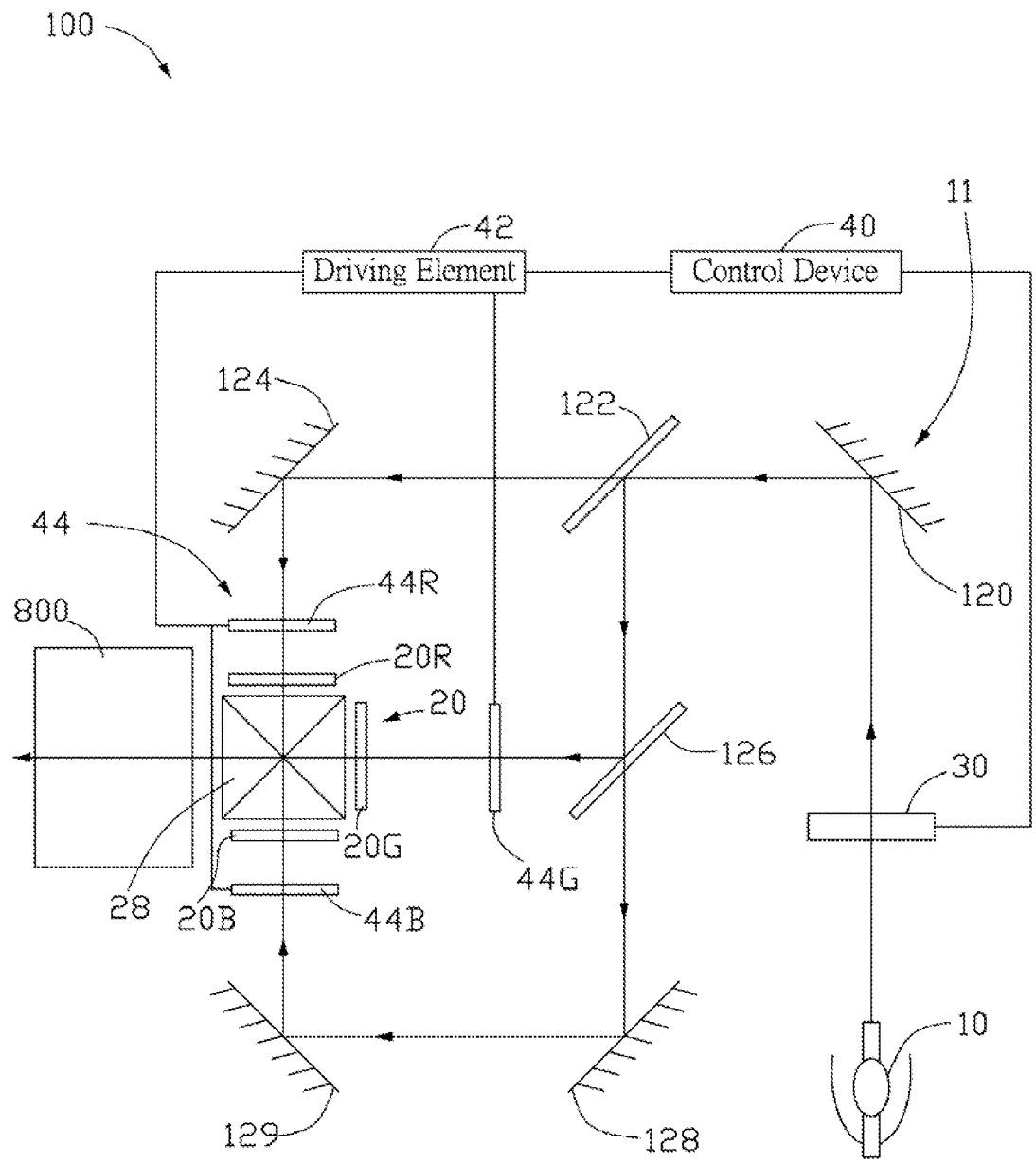
FIG. 1 is a perspective view of a projecting system in accordance with a first present embodiment.

Referring to FIG. 1, a projecting system 100, in accordance with a first present embodiment, is shown. The projecting system 100 includes a light source 10, a splitter device 11, a light-modulating device 20, a combiner 28, a color temperature detecting device 30, a control device 40, an adjusting device 44, and a projecting lens 800. In this present embodiment, the projecting system is an LCD (liquid crystal display) projecting system. The splitter device 11, the adjusting device 44, the light-modulating device 20 are arranged along a light path associated with the light source 10. Light emitted from the light source 10 is modulated by the light-modulating device 20 and then is projected via the projecting lens 800 to form an image on a screen. The light source 10 is a high-pressure mercury lamp, a metal halide lamp, or a white light emitting diode or other light source used in LCD projecting systems.

The light-modulating device 20 modulates the light to create an image. The light-modulating device 20 includes a first LC (liquid crystal) panel 20R, a second LC panel 20B, and a third LC panel 20G. The splitter device 11 includes a first reflector 120, a first splitter 122, a second reflector 124, a second splitter 126, a third reflector 128, and a fourth reflector 129. Light emitted from the light source 10 is reflected by the first reflector 120 towards the first splitter 122. Generally, the light emitted from the light source 10 is white light containing red, blue, and green components. The red component contained in the light emitted from the light source 10 is split by the first splitter 122 and is propagated towards the second reflector 124 and then is reflected by the second reflector 124 towards the first LC panel 20R. The other two components (blue and green) are reflected by the first splitter 122 towards the second splitter 126. The green component is reflected by the second splitter 126 towards the third LC panel 20G. The blue component is split by the second splitter 126 and is propagated towards the third reflector 128 and then is reflected by the third reflector 128 towards the fourth reflector 129 and is finally reflected by the fourth reflector 129 towards the second LC panel 20B. The red, blue, and green components are respectively modulated by the first LC panel 20R, the second LC panel 20B, and the third LC panel 20G, and then are combined by the combiner 28.

The combiner 28 is a combination of four triple prisms in a cross-over fashion. The combiner 28 combines light modulated by the light-modulating device 20 to produce a projecting light. The projecting light is projected by the projecting lens 80 to project an image onto a screen.

The adjusting device 44 includes a driving element 42 and at least one adjusting element. The driving element 42 (e.g., a motor) drives the at least one adjusting element to rotate to any angle. The at least one adjusting element is an optical element (e.g., a polarizer or a phase retarder) capable of adjusting transmittance (e.g., luminous flux) of an incident light by changing incident direction of the incident light relative to the at least one adjusting element. In this present embodiment, the number of the adjusting elements is two: a first adjusting element 44R and a second adjusting element 44B. The first adjusting element 44R and the first LC panel 20R are arranged along a light path between the second reflector 124 and the combiner 28 in that order. The second adjusting element 44B and the second LC panel 20B are arranged along a light path between the fourth reflector 129 and the combiner 28 in that order.

The control device 40 stores a plurality of selectable pre-determined color temperature values therein for a user to select a pre-determined color temperature value, and CIE (International Commission on Illumination) 1931 Chromaticity Diagram are pre-built in the control device 40. The control device 40 is configured for controlling the adjusting device 44 to adjust transmittance of the light transmitted therethrough so as to adjust the color temperature value of the light to the selected pre-determined color temperature value.

In this present embodiment, the color temperature detecting device 30 (e.g., a color analyzer) is positioned in a light path between the first splitter 122 and the light source 10 for converting light signals to electrical signals. Color temperature value of the light emitted from the light source 10 varies due to varying temperature of the light source 10. Therefore, real color temperature value of an image of the projecting system 100 may depart from a pre-determined color temperature value of the profile selected. The color temperature detecting device 30 positioned in the light path associated with the light source 10 detects real color temperature value and chromaticity coordinates of the light emitted from the light source 10 and outputs the real color temperature value and chromaticity coordinates of the light to the control device 40. The control device 40 determines whether the real color temperature value of the light is same as the pre-determined color temperature value of the profile selected.

If the real color temperature value of the light emitted from the light source 10 is less than the pre-determined color temperature value of the profile selected, the control device 40 computes a primary color, such as a red color to be adjusted according to the chromaticity coordinates of the red light and generates a voltage to drive the driving element 42. Therefore, the driving element 42 drives the first adjusting element 44R to rotate to an angle in response to the voltage generated by the control device 40 so as to reduce transmittance of the red color. In this way, by adjusting the chromaticity coordinates of the red light, proportion of the red light contained in the light emitted from the light source 10 is reduced before being modulated by the first LC panel 20R. Therefore, in the subsequent combining of the combiner 28, the proportion of the red light contained in the projecting light is also reduced. The color temperature value of the projecting light combined by the combiner 28 is increased to fit the pre-determined color temperature value of the profile selected. Alternatively, the control device 40 can also control the second adjusting element 44B to rotate so as to increase proportion of the blue light contained in the projecting light to increase the color temperature value of the projecting light.

If the real color temperature value of the light emitted from the light source 10 is greater than the pre-determined color temperature value of the profile selected, the control device 40 computes a primary color, such as a blue color to be adjusted according to the chromaticity coordinate of the blue light and generates a voltage to drive the driving element 42. Therefore, the driving element 42 drives second adjusting element 44B to rotate an angle respond to the voltage generated by the control device 40 so as to reduce transmittance of the blue color. In this way, by adjusting the chromaticity coordinates of the blue light, proportion of the blue light contained in the light emitted from the light source 10 is reduced before being modulated by the second LC panel 20B. Therefore, in the subsequent combining of the combiner 28, the proportion of the blue light contained in the projecting light is also reduced. The color temperature value of the projecting light combined by the combiner 28 is reduced to fit the pre-determined color temperature value of the profile selected. Alternatively, the control device 40 also can control the first adjusting element 44R to rotate so as to increase proportion of the red light contained in the projecting light to reduce the color temperature value of the projecting light.

It is understandable that the adjusting device 44 further includes a third adjusting element 44G positioned between the second splitter 126 and the third LC panel 20G.

Figure 2:
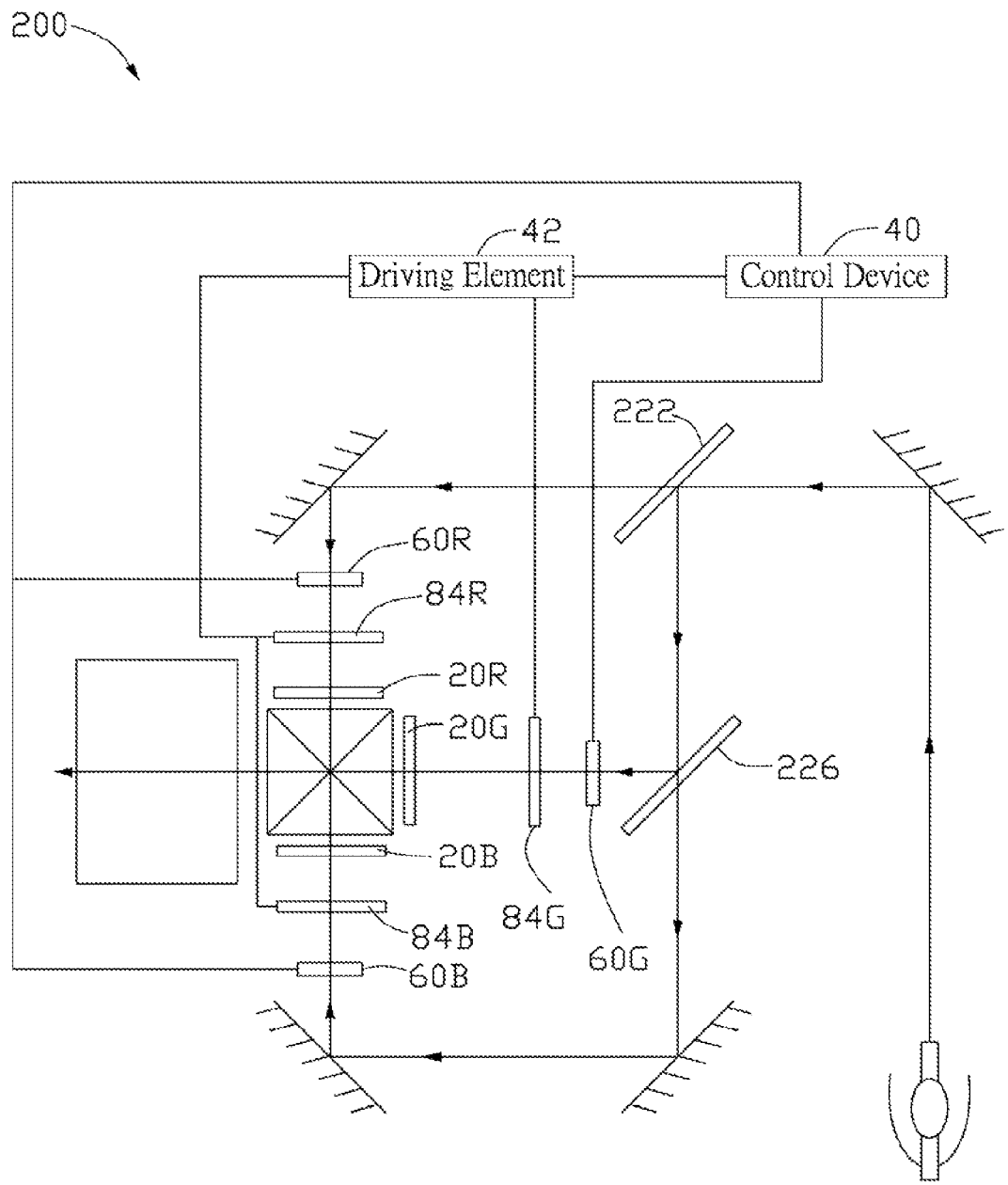
FIG. 2 is a perspective view of a projecting system in accordance with a second present embodiment.

Referring to FIG. 2, a projecting system 200, according to the second present embodiment, is shown. The differences between the projecting system 100 and the projecting system 200 are that the projecting system 200 includes three color temperature detecting devices (a first color temperature detecting device 60R, a second color temperature detecting device 60B, and a third color temperature detecting device 60G). The first color temperature detecting device 60R is positioned into the light path between the first adjusting element 84R and the first splitter 222 to detect color temperature value and chromaticity coordinates of the red light before being modulated by the first LC panel 20R, and the second color temperature detecting device 60B is positioned into the light path between the second adjusting element 84B and the second splitter 226 to detect color temperature value and chromaticity coordinates of the blue light before being modulated by the second LC panel 20B. The third color temperature detecting device 600 is positioned into the light path between the third adjusting element 84G and the second splitter 226 to detect color temperature value and chromaticity coordinates of the green light before being modulated by the third LC panel 20G.

Since light before being modulated by the LC panel is detected by the color temperature detecting devices, the real color temperature value of the light before being modulated can be adjusted by the adjusting elements to fit a pre-determined color temperature value of the profile selected. In this way, a color temperature value of the projecting image is satisfactory.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A projecting system, comprising:
    a light source for emitting light; a color temperature detecting device for detecting a color temperature value of the light emitted from the light source;
    a control device for storing a plurality of selectable pre-determined color temperature values therein for a user to select a pre-determined color temperature value;
    an adjusting device disposed in a light path associated with the light source, the control device being configured for controlling the adjusting device to adjust transmittance of the light transmitted therethrough so as to adjust the color temperature value of the light to the selected pre-determined color temperature value; and
    a light-modulating device for modulating the light to create an image, wherein the color temperature device detecting device, the adjusting device and the light-modulating device are arranged in that order along the light path associated with the light source.

2. The system as claimed in claim 1, wherein the light source is a high-pressure mercury lamp, a metal halide lamp, or a white light emitting diode.

3. The system as claimed in claim 1, wherein the color temperature detecting device is a color analyzer.

4. The system as claimed in claim 1, further comprising a splitter device for splitting the light emitted from the light source into three primary lights of red, blue and green.

5. The system as claimed in claim 4, wherein the color temperature detecting device is positioned in the light path associated with the light emitted from the light source between the light source and the splitter device.

6. The system as claimed in claim 4, wherein the color temperature detecting device is positioned in the light path associated with one of the three primary lights of red, blue and green between the splitter device and the light-modulating device.

7. The system as claimed in claim 6, wherein the light-modulating device comprises a first liquid crystal panel, a second liquid crystal panel, and a third liquid crystal panel; the adjusting device comprises a first adjusting element, a second adjusting element, and a third adjusting element; the color temperature detecting device comprises a first color temperature detecting device, a second color temperature detecting device, and a third color temperature detecting device; the first color temperature detecting device, the first adjusting element, and the first liquid crystal panel are arranged along a red primary light path in that order; the second color temperature detecting device, the second adjusting element, and the second liquid crystal panel are arranged along a blue primary light path in that order; the third color temperature detecting device, the third adjusting element, and the third liquid crystal panel are arranged along a green primary light path in that order.

8. The system as claimed in claim 7, wherein the first adjusting element, the second adjusting element, and the third adjusting element are polarizers or phase retarders.

9. The system as claimed in claim 8, wherein the adjusting device further comprises a driving element for rotating the first adjusting element, the second adjusting element, and the third adjusting element.

10. The system as claimed in claim 9, wherein the driving element is a motor.

11. A projecting system, comprising:
a light source for emitting light;
a splitter device for splitting the light emitted from the light source into three primary lights of red, blue and green;
a color temperature detecting device for detecting a color temperature value of the light emitted from the light source, the color temperature detecting device being positioned in the light path associated with the light emitted from the light source between the light source and the splitter device;
a control device for storing a plurality of selectable pre-determined color temperature values therein for a user to select a pre-determined color temperature value;
an adjusting device disposed in a light path associated with the light source, the control device being configured for controlling the adjusting device to adjust transmittance of the light transmitted therethrough so as to adjust the color temperature value of the light to the selected pre-determined color temperature value; and
a light-modulating device for modulating the light to create an image.

12. The system as claimed in claim 11, wherein the light source is a high-pressure mercury lamp, a metal halide lamp, or a white light emitting diode.

13. The system as claimed in claim 11, wherein the color temperature detecting device is a color analyzer.

14. The system as claimed in claim 11, wherein the light-modulating device comprises a first liquid crystal panel, a second liquid crystal panel, and a third liquid crystal panel; the adjusting device comprises a first adjusting element, a second adjusting element, and a third adjusting element; the first adjusting element and the first liquid crystal panel are arranged along a red primary light path in that order; the second adjusting element and the second liquid crystal panel are arranged along a blue primary light path in that order; the third adjusting element and the third liquid crystal panel are arranged along a green primary light path in that order.

15. A projecting system, comprising:
a light source for emitting light;
a splitter device for splitting the light emitted from the light source into three primary lights of red, blue and green;
a color temperature detecting device for detecting a color temperature value of the light emitted from the light source, the color temperature detecting device being positioned in the light path associated with one of the three primary lights of red, blue and green between the splitter device and the light-modulating device;
a control device for storing a plurality of selectable pre-determined color temperature values therein for a user to select a pre-determined color temperature value;
an adjusting device disposed in a light path associated with the light source, the control device being configured for controlling the adjusting device to adjust transmittance of the light transmitted therethrough so as to adjust the color temperature value of the light to the selected pre-determined color temperature value; and
a light-modulating device for modulating the light to create an image.

16. The system as claimed in claim 15, wherein the light source is a high-pressure mercury lamp, a metal halide lamp, or a white light emitting diode.

17. The system as claimed in claim 15, wherein the color temperature detecting device is a color analyzer.

18. The system as claimed in claim 15, wherein the light-modulating device comprises a first liquid crystal panel, a second liquid crystal panel, and a third liquid crystal panel; the adjusting device comprises a first adjusting element, a second adjusting element, and a third adjusting element; the color temperature detecting device comprises a first color temperature detecting device, a second color temperature detecting device, and a third color temperature detecting device; the first color temperature detecting device, the first adjusting element, and the first liquid crystal panel are arranged along a red primary light path in that order; the second color temperature detecting device, the second adjusting element, and the second liquid crystal panel are arranged along a blue primary light path in that order; the third color temperature detecting device, the third adjusting element, and the third liquid crystal panel are arranged along a green primary light path in that order.

* * * * *